Sept. 27, 1960 E. SAUDINAITIS ET AL 2,954,504

SCANNING GENERATOR

Filed Jan. 19, 1959 3 Sheets-Sheet 1

INVENTORS
Jean G. V. Isabeau
Emmanuel Saudinaitis
BY James E. Tracy
ATTORNEY

INVENTORS
Jean G. V. Isabeau
Emmanuel Saudinaitis
BY James E. Tracy
ATTORNEY

INVENTORS
Jean G. V. Isabeau
Emmanuel Saudinaitis
BY James E. Tracy
ATTORNEY

United States Patent Office 2,954,504

Patented Sept. 27, 1960

2,954,504

SCANNING GENERATOR

Emmanuel Saudinaitis, Bensenville, Ill., and Jean G. V. Isabeau, Palo Alto, Calif., assignors to Zenith Radio Corporation, a corporation of Delaware Filed Jan. 19, 1959, Ser. No. 787,680

15 Claims. (Cl. 315—27)

This invention pertains to a new and improved scanning generator for developing a substantially linear sawtooth current waveform in the magnetic deflection yoke normally employed for the picture tube in a conventional television receiver.

The low power requirements and relatively small physical size of transistors render their use in many classes of existing apparatus highly desirable from the point of view of economy of operation and overall physical size. Because of the reduced power requirements, the problem of maintaining appropriately low temperatures has been met, thus permitting compactness without danger of component failure.

Due to these advantages, the possibility of designing a completely transistorized and commercially acceptable television receiver has received considerable attention, particularly in the light of the rapidly increasing interest in small semi-portable television sets. While certain portions of the circuitry customarily used in such receivers may readily be altered to permit the substitution of transistors for the usual vacuum tubes, other portions require more than a superficial re-design to make the application of the transistor practical. The scanning circuits, both horizontal and vertical, fall into the latter category, primarily because of the substantial energy which must be supplied to replace circuit losses normally incurred when the electron beam is swept over the phosphor screen of the picture tube. Transistors are now available having adequate maximum allowable collector power dissipation ratings to permit their use in scanning circuits.

A transistorized vertical scanning generator as applied to television apparatus must be capable of providing a substantially linear sawtooth waveform in the magnetic deflection yoke which normally surrounds the neck of the cathode ray picture tube. While the generator must contain provisions to permit synchronization by the application of vertical synchronizing pulses, it is preferable that the generator itself be free running to insure proper operation under weak signal conditions. From the point of view of economy, it is desirable that the generator contains a minimum of components commensurate with the establishment of a sweep current waveform of a quality comparable to, or better than, that found in present-day vacuum tube generators.

Accordingly, it is an object of the present invention to provide a new and improved cyclically operating transistor scanning generator particularly applicable to a television receiver.

It is another object to provide a transistor scanning generator capable of producing a substantially linear sawtooth current waveform in a magnetic deflection yoke.

It is still another object of the present invention to provide a scanning generator of relatively inexpensive construction and yet having relatively high efficiency and stability.

It is a further object of the invention to provide an improved free running vertical scanning generator of the transistor type which contains provisions for external synchronization.

The cyclically operating scanning generator of the present invention develops in a magnetic deflection yoke a periodically recurring substantially linear sawtooth current waveform having during each cycle a relatively long trace interval and a relatively short retrace interval. The generator comprises a three-terminal transistor having a base, emitter and collector electrodes. Means including a source of unidirectional operating potential is provided for establishing a forward bias between the base and emitter electrodes. There is a condenser and a charging circuit for developing across the condenser during each of the trace intervals a gradually varying voltage exhibiting a waveshape of substantially constant slope. Means coupling the condenser to the base electrode translates a gradually varying input drive current, also of substantially constant slope, through the base-emitter conduction path of the transistor during each of the trace intervals. A discharge circuit rapidly discharges the condenser during each of the retrace intervals and this circuit includes a unidirectional device having at least two terminals. A load circuit including the magnetic deflection yoke is coupled between the emitter and collector electrodes and establishes an amplified output current in the magnetic deflection yoke of substantially the same waveshape as that of the input drive current with gradually varying output current during each of said trace intervals and abruptly changing output current during each of said retrace intervals. Finally, the scanning generator of the present invention contains means for establishing conduction in the unidirectional device during each of the retrace intervals and for maintaining said device in its cut-off condition during each of the trace intervals.

The features of this invention which are believed to be new are set forth with particularity in the appended claims. The invention, together with further objects and advantages thereof, may best be understood, however, by reference to the following description in conjunction with the accompanying drawings, in the several figures of which like reference numerals identify like elements, and in which:

In order to facilitate an understanding of the operation of transistorized vertical scanning generators constructed in accordance with the present invention, certain general concepts will initially be considered before discussing the circuit details of the disclosed embodiments. As is well known, the electron beam in a conventional cathode ray picture tube is swept linearly across the face of the tube or screen in a repetitive manner under the influence of vertical and horizontal sweep signals.

The vertical and horizontal scanning rates have been established in the United States at 60 and 15,750 complete scans per second, respectively. This basic difference in scanning rate is one of the major factors which must be considered in the design of practical vertical and horizontal scanning circuits. At the slower or 60 cycle per second vertical rate, the conventional deflection coils in a television receiver appear substantially resistive while at the 15,750 horizontal scanning rate an equivalent deflection coil acts as a substantially inductive reactance. As a result, the vertical deflection coils may be treated as a resistive impedance and, when used as the load for an active circuit element such as a transistor, do not materially affect the wave form of the required input drive signal. It should, however, be realized that the inductive character of the vertical deflection coils must be taken into account during the retrace or fly-back portion of the sweep cycle since a voltage spike or pulse appears across the coils during this interval and is in series-aiding relation to the circuit voltage source; hence it is instrumental in determining the required voltage rating of the transistor.

The vertical deflection coils may be directly connected to the collector of a conventional power transistor without an intervening impedance matching transformer. When the base-emitter circuit is driven by an appropriately shaped sawtooth current waveform during each trace interval, the current through the vertical deflection coils has substantially the same waveform with little discernible deviation attributable to inductive effect.

Figure 1:
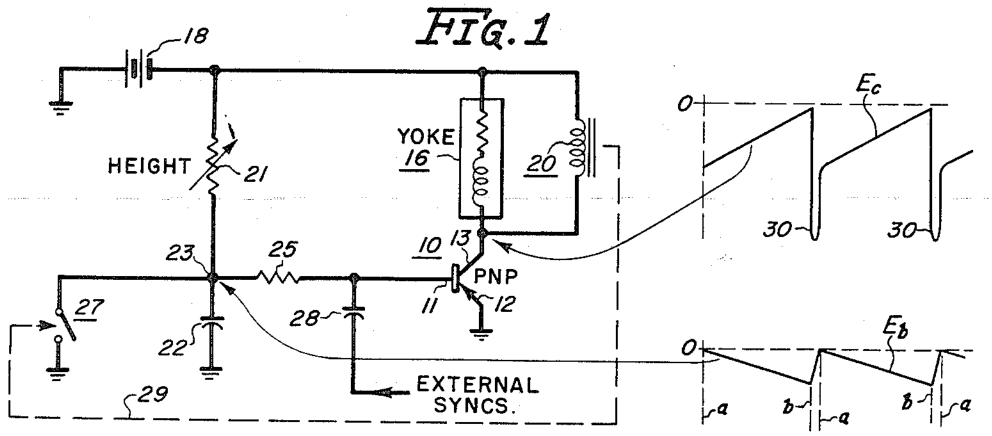
Figures 1 and 2 are schematic diagrams of different transistor vertical scanning generators useful in explaining the invention.

Turning now to the specific construction of the arrangement of Figure 1, a three-terminal current amplifying, power transistor 10, which is illustrated of the PNP type, has a base electrode 11, an emitter electrode 12, and a collector electrode 13. Collector electrode 13 is connected to one terminal of a magnetic deflection yoke 16, the other terminal of which is connected to the negative terminal of a source of unidirectional operating potential, shown as a battery 18. Both emitter 12 and the positive terminal of source 18 are coupled to ground, thereby completing the emitter-collector circuit of transistor 10. The load circuit for transistor 10 therefore consists primarily of yoke 16. As shown, yoke 16 contains both resistance and inductance. The inductance is of negligible import during trace or sweep intervals, while the resistance is relatively unimportant during retrace intervals. Yoke 16 is shunted by a direct current bypass inductor 20 in order to substantially eliminate decentering and to reduce power losses.

Direct current bypass inductor 20 is provided to bypass a major portion of the direct current of transistor 10 around yoke 16, thereby eliminating beam centering problems. This inductor is chosen to exhibit a D.C. resistance substantially lower than that of yoke 16 while presenting a substantially higher impedance than yoke 16 to the sweep components of the base-emitter drive current. It should be evident that inductor 20 may be eliminated if other means are provided to accomplish centering of the sweep.

One terminal (specifically the upper or high-voltage terminal) of an adjustable height control resistor 21 is connected to the negative terminal of battery 18 and the other or lower terminal of the resistor is connected through a charging condenser 22 to ground. The junction of resistor 21 and condenser 22 (designated for convenience of explanation as terminal 23) is connected through a fixed resistor 25 to base electrode 11. A source of external synchronizing pulses is also coupled to base 11 by means of a coupling condenser 28. Condenser 22 is shunted by a switching device shown for convenience merely as a simple off-on switch 27. Switching device 27, which may be called a reset switch since it serves to discharge or reset condenser 22, is controlled in a manner to be explained later by means of feedback from the load circuit of transistor 10, as indicated by the dashed construction line 29.

Both the maximum and minimum resistance of height control variable resistor 21 are extremely high with respect to the combined resistance of resistor 25 and the base-emitter input resistance of transistor 10 in order that a substantially constant current may flow through resistor 21. Any deviation of the input resistance of the transistor, which may arise from changing base current, therefore has a negligible effect on the magnitude of current flowing through resistor 21.

In operation, unidirectional potential source 18 establishes a forward bias between base electrode 11 and emitter electrode 12 by virtue of the fact that base 11 is made negative with respect to the emitter, the transistor being of the PNP type. During each sweep or trace interval, a relatively constant magnitude of charging current flows through resistor 21 to condenser 22, in the direction from terminal 23 to the negative terminal of source 18. The condenser, functioning as an integrating device with respect to charging current, therefore charges up in exponential fashion from zero potential toward the negative potential level of source 18. The potential at terminal 23 therefore increases in a negative sense during each trace interval as shown by waveform $E_b$ in Figure 1. Of course, intervals *a—b* designate the trace intervals and *b—a* the retrace intervals. Thus, a gradually varying voltage is developed across condenser 22 during each trace interval exhibiting a waveshape of substantially constant slope. By virtue of the coupling between condenser 22 and base 11, the condenser translates a gradually varying, specifically increasing, input drive current also of substantially constant slope through the base-emitter conduction path of transistor 10 during each trace interval.

Long before condenser 22 has an opportunity to become fully charged the trace interval is completed, since a feedback pulse is developed during the succeeding retrace interval in the load circuit of transistor 10 to close or to expedite the closing of reset switch 27 and discharge condenser 22. Resetting may occur in at least two different ways. Transistor 10 may be driven to the collector current saturation condition by the increasing base current, at which time a pulse is developed across the yoke and fed back to close switch 27. Or, in the alternative, switch 27 may be provided with its own control circuitry which automatically begins to close the switch independent of the collector current condition. Upon each discharge of condenser 22, namely upon the termination of each retrace interval, another cycle commences. Of course, condenser 22 never has a chance to become fully charged since its charge time constant is made long with respect to the duration of each trace interval.

Since the input drive current translated through the base-emitter conduction path of transistor 10 is of sawtooth waveform, the ouput current through yoke 16, which is an amplified replica of the input drive current, also is a sawtooth in waveshape as required to produce the magnetic field for linear deflection of the scanning beam. By virtue of the fact that transistor 10 is of the PNP type, the transistor current during trace is in the direction from collector 13 to battery 18 and its variations are in phase with the variations of the base-emitter current. The emitter-collector current thus increases in amplitude as the base-emitter current increases during each trace interval. When the collector current is relatively low in magnitude, namely at the beginning of each trace interval, a relatively small voltage drop prevails across yoke 16 and the potential at collector 13 approaches the negative potential level of source 18. As each trace interval progresses and the collector current increases, a progressively increasing voltage drop occurs across yoke 16 and since this voltage drop is in series opposing relation with respect to battery 18, the potential at collector 13 rises as shown by the waveform $E_c$ in Figure 1. From waveform $E_c$ it will be noted that during the retrace or flyback interval, a relatively high amplitude flyback pulse 30 is developed. This results from the inductive characteristic of yoke 16 which predominates over its resistance during retract intervals. The magnetic energy in yoke 16 is damped by the emitter-collector resistance of transistor 10 and/or by the losses in bypass inductor 20.

Coupling capacitor 28 is provided to permit the introduction of external synchronization pulses to the base of transistor 10. As is customary in conventional television receivers, vertical and horizontal synchronizing information is included in the composite transmitted television signal. This information is usually separated from the remainder of the signal by a sync separation circuit which applies the appropriate synchronizing pulses to the horizontal and vertical sweep circuits. Positive going vertical synchronizing pulses, derived from such a separator, may be applied to the circuit of Figure 1 to achieve synchronized operation. If desired to synchronize the operation of the scanning generator, the parameters of the various components are chosen such that the free running frequency is slightly lower than frequency of sync pulses. Positive pulses applied to base 11 render transistor 10 non-conductive and thus create pulses in the collector circuit which are utilized to operate switch 27.

Variations in the resistance of height control resistor 21 vary the amplitude of constant charging current to condenser 22 and this has the effect of varying the drive on current amplifying transistor 10, permitting the adjustment of the sweep amplitude to any desired value. For example, by increasing the charging current for condenser 22, the condenser charges up faster and thus increases the sweep amplitude.

The linearity of the voltage waveform across condenser 22 is determined by its time constant; the longer the time constant, the more linear or "smoother" the waveshape. As the resistance of resistor 21 is considerably higher than that shunting condenser 22, the time constant of the condenser is determined primarily by the base-emitter input resistance of transistor 10 plus the reistance of resistor 25. Since the input resistance of the transistor may possibly vary with increasing input drive current, non-linearity or curvature in the drive current and consequently in the collector current may result. This may be partially compensated by selecting resistor 25 to be relatively high with respect to the input resistance of the transistor so that the resistance shunting condenser 22 will be substantially constant, being determined primarily by fixed resistor 25. However, the larger resistor 25 is made, the higher potential is required across condenser 22 in order to develop an adequate drive for the transistor. This increased voltage across the condenser increases the strain on reset switch 27. In addition, the introduction of relatively high resistance resistor 25 does not serve to correct possible non-linearity in the current gain.

Figure 2:
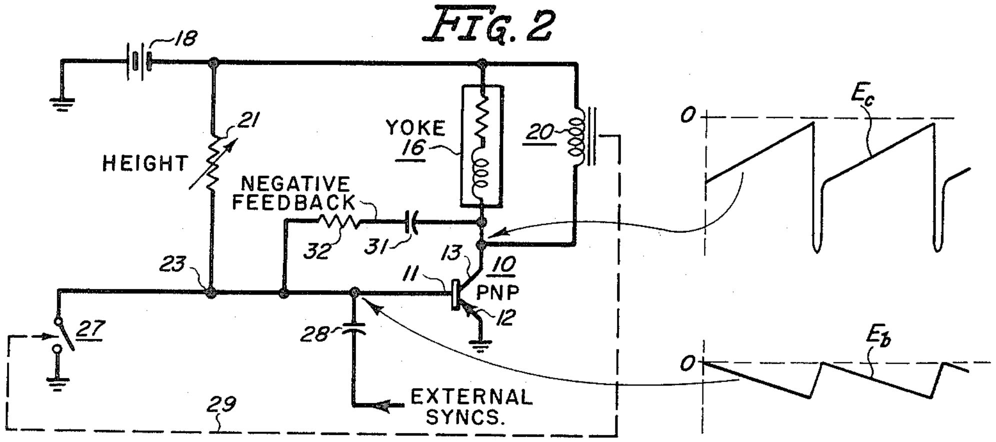

The vertical scanning generator illustrated in Figure 2 represents an improvement over that in Figure 1 in that both input resistance non-linearity and current gain non-linearity are minimized. Charging condenser 22 has been eliminated and replaced by an integrating feedback circuit including the series combination of a condenser 31 and a resistor 32 coupled between collector 13 and base 11. The incorporation of a negative feedback circuit is advantageous since, as is the case with any negative or degenerative amplifier, there is a tendency to attenuate or resist a change, which minimizes undesired distortion. Negative feedback tends to maintain a predetermined relation between the input and output signals, independently of load condition.

In operation of the generator of Figure 2, the relatively high constant current translated through resistor 21 divides between two parallel circuits, one of which includes the negative feedback circuit in series with the emitter-collector conduction path, and the other of which comprises merely the base-emitter conduction path of transistor 10. A relatively constant charging current, flowing in the direction from collector 13 to condenser 31, is thus provided for charging condenser 31 in exponential fashion. Consequently, the voltage at base 11 varies in substantially the same manner as in the case of the arrangement of Figure 1, as shown by waveform $E_b$ in Figure 2, and thus the same output voltage waveform $E_c$ is developed. Because of the presence of the negative feedback circuit, if the base-emitter current tends to change due to a changing input resistance of the transistor or if the collector current tends to vary due to non-linearity in the current gain, automatic compensation takes place to minimize such current changes.

Resistor 32 along with the equivalent emitter-collector resistance of the transistor serve to dissipate the stored magnetic energy in the yoke during the retrace or flyback intervals. When switch 27 begins to close at the start of each retrace interval, it is the retrace pulses that expedite the closing and thus the higher the amplitude of the reset pulses the faster switch 27 will be closed completely and consequently the shorter the retrace time will be. This feature will be more fully explained in connection with the description of the arrangement of Figure 4.

Figure 3:
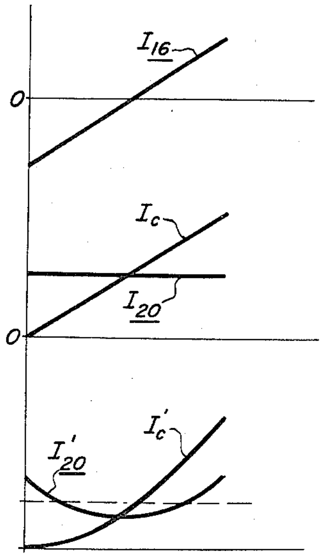
Figure 3 is a graphical representation of certain current waveforms helpful in describing the operation of the generator of Figure 2.

The circuit of Figure 2 has another advantage over that of Figure 1 due to the presence of feedback in that the bypass inductor may be made of relatively small finite value. This obtains since the output waveshape is substantially independent of the load. Using a finite value for bypass inductor 20 may lead to a reduction in power consumption. The waveforms of Figure 3 are particularly helpful in explaining this feature. Current waveform $I_{16}$ indicates the yoke current during a single trace interval with a negligible D.C. component. Waveform $I_c$ illustrates the collector current and constitutes the sum of the yoke current $I_{16}$ and a constant current flowing through bypass inductor 20 when its inductance is infinite. This constant current by itself is shown by waveform $I_{20}$. If the bypass inductor is selected to be of finite value, the current translated therethrough exhibits a parabolic ripple as shown by waveform $I'_{20}$. This occurs since inductor 20 functions as an integrating circuit with respect to the voltage applied across it and the integral of a sawtooth waveform is a parabola. The parabolic current flowing through the inductor therefore results in a parabolic component in the collector current as indicated by waveform $I'_c$. Thus, analyzing the operation in reverse, this means that in order to obtain a linear sweep as shown by waveform $I_{16}$, it is actually necessary that the collector current be non-linear with an upward curvature as shown by $I'_c$. The average collector current to obtain linear sweep may therefore be less than that which would be required in the absence of the integrating function of inductor 20. This permits a reduction in the collector dissipation. The advantage of the integrating feedback circuit is that the collector current is automatically adjusted to the current curvature.

Figures 4, 5, 6:
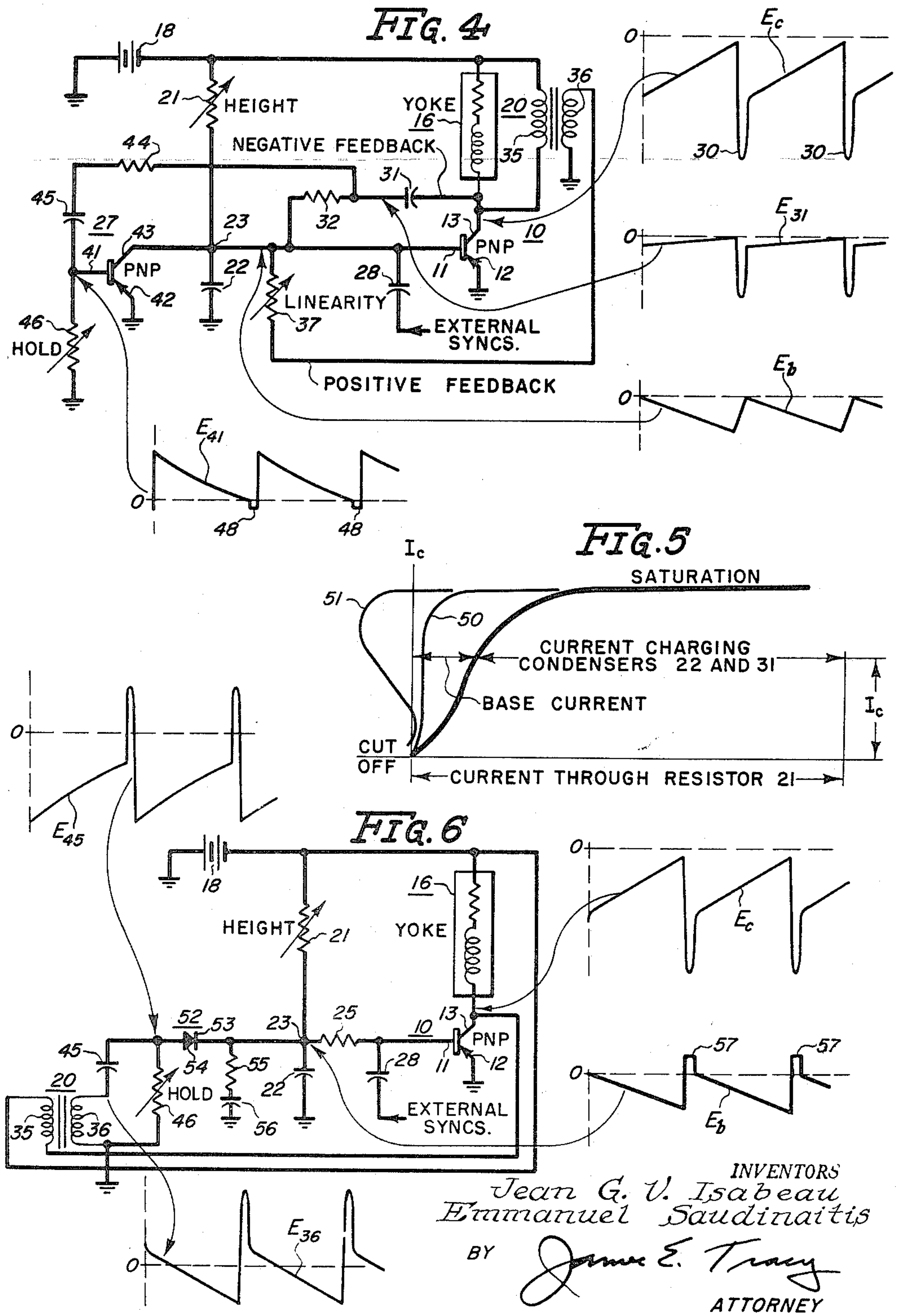
Figure 4 illustrates still another transistor vertical scanning generator and is also advantageous in providing a full explanation of the invention.
Figure 5 represents the base-collector current transfer characteristic of one of the transistors included in the arrangement of Figure 4.
Figures 6 and 7 illustrate modifications of the generators shown in Figures 1 and 2, respectively, in accordance with the present invention.

While the circuit of Figure 2 provides better linearity than that achieved with the arrangement of Figure 1, because of the relatively low gain of the power transistor, there is still room for linearity improvement. The circuit of Figure 4 is calculated to achieve that end. In Figure 4, inductor 20 takes the form of a transformer having a primary winding 35 connected in shunt to yoke 16 and a secondary winding 36 with one terminal connected to ground and the other connected to base 11 through an adjustable linearity control resistor 37. Transformer 20 is polarized such that base 11 is provided with positive feedback. In other words, the feedback current through winding 36 is in phase with the input drive current.

One form which reset switch 27 and its control circuitry may take is shown in detail in Figure 4. As there illustrated, switch 27 is a conventional PNP type transistor having base, emitter and collector electrodes, 41, 42, 43 respectively. Collector 43 is connected to terminal 23, namely the junction of condenser 22 and resistor 21, and emitter 42 is connected to ground. Base 41 is connected to the junction of resistor 32 and condenser 31 through the series circuit containing a resistor 44 and a condenser 45. Base 41 is also connected to ground through a variable hold control resistor 46.

It will be noted that condenser 22, which was replaced by condenser 31 in the arrangement of Figure 2, is incorporated in the circuit of Figure 4. In this structure condensers 31 and 22 charge up concurrently during each trace interval. Most of the drive power is provided by condenser 22 while condenser 31 serves primarily for correction of linearity through feedback of the negative or degenerative type. This negative feedback only provides the power necessary to correct for departures from a constant slope. Resistor 44 prevents excessive loading of the feedback circuit comprising units 31 and 32 by the input impedance of transistor 27.

With respect to the retrace or flyback pulses 30, developed in the collector circuit, the capacitive reactance of condenser 31 is negligible for the obvious reason that the frequency components defining such spikes are relatively high, and thus the retrace pulses appear at the junction of resistor 32 and condenser 31 with little attenuation as shown by waveform $E_{31}$. However, with respect to the relatively low frequency sawtooth waveform of the collector current during the sweep or trace intervals, condenser 31 presents a relatively high impedance and thus the sawtooth component is greatly attenuated as will be observed in waveform $E_{31}$. The negative pulses of curve $E_{31}$ are applied to base electrode 41 of transistor 27 to initiate conduction between base and emitter. The transistor conducts strongly in response to these retrace pulses in the direction from base 41 to the lower terminal of condenser 45 and also in the direction from base 41 to ground through resistor 46, charging condenser 45 in a positive sense during such retrace intervals causing transistor 27 to be once again cut-off or blocked. However, until condenser 45 is sufficiently charged, the emitter-collector path of transistor 27 is rendered conductive during each retrace interval in order to discharge condensers 22 and 31.

The positive potential stored on condenser 45 maintains transistor 27 during each trace interval in its non-conductive condition, permitting condensers 22 and 31 to charge up anew and initiate successive cycles. Condenser 45 slowly discharges through hold control resistor 46 and the voltage on base 41 therefore slowly decreases toward zero potential, in the trace interval, as shown by waveform $E_{41}$. The discharge time constant of condenser 45 may be relied upon to determine the duration of each trace interval. For example, the operating bias may be so established that, as condenser 45 discharges during each trace interval, transistor 27 is rendered conductive once again when the potential on base 41 reaches zero. Condensers 22 and 31 immediately commence to discharge through the emitter-collector conduction path of transistor 27 resulting in an abrupt discontinuance in the exponential rise of current in yoke 16. The inductive character of yoke 16 causes it to serve as a differentiating circuit with respect to abrupt changes in collector current of transistor 10 and initiate the transients or spikes 30 of waveform $E_c$. Each transient is transferred through condensers 31 and 45 and resistor 44 to base 41 to expedite or accelerate the closing of transistor 27 so that it is rapidly made more fully conductive. Condensers 22 and 31 thus discharge faster, resulting in a regenerative effect which continues until the discharging process is complete.

The relatively low amplitude negative going pulses 48 of curve $E_{41}$ result from the negative retrace pulses of curve $E_{31}$. During the retrace intervals transistor 27 conducts and in a sense serves as a clamping device for the negative pulses of waveform $E_{31}$. The base-emitter resistance of transistor 27 is relatively low during conduction and the negative pulses of curve $E_{31}$ are developed primarily across resistor 44.

In order to explain the manner in which positive feedback through transistor 37 improves linearity, attention is directed to Figure 5 wherein the base-to-collector current gain characteristic of transistor 10 is illustrated. The relatively thick or heavy line in Figure 5 indicates the normal current gain characteristic of the power stage in the absence of positive feedback, with base current being plotted on the abscissa or horizontal scale and collector current on the ordinate or vertical scale. As the base current increases in magnitude, the collector current does likewise until a point is reached at which the transistor saturates. The substantially constant current flowing through height control resistor 21 is plotted as an ordinate line intersecting the abscissa axis at a current value determined essentially by dividing the magnitude of potential source 18 by the value of resistance 21. As mentioned before, resistor 21 is relatively high compared to the base-emitter resistance of transistor 10 and to resistor 32 which may therefore be ignored.

Neglecting the positive feedback circuit, the constant current flowing through resistor 21 during the trace interval is divided through three parallel circuits comprising: (1) the base-emitter conduction path of transistor 10, (2) condenser 31 in series with the emitter-collector path of transistor 10 and resistor 32, and (3) condenser 22. As the input drive or base current increases, the magnitude of current available for charging condensers 22 and 31 decreases, as may be observed in Figure 5. The charging current, of course, should remain constant in order to charge those condensers linearly; a decrease in charging current results in non-linearity in the collector current, the current specifically curving or bowing downward as it generally increases. In other words, the slope gradually decreases.

When positive feedback is introduced as by means of secondary winding 36, a portion of the base drive current is provided through resistor 37 and condensers 22 and 31 charge up at a more constant rate as required to linearize the output current. Curves 50 and 51 in Figure 5 illustrate the manner in which the current gain characteristic of the power stage may be effectively changed by virtue of the positive feedback with different adjustments of resistor 37. If the positive feedback is increased beyond the conventional stability point, the S-shaped equivalent charactreistic 51 is obtained with the possibility of producing an upward curvature (namely, an increasing slope) in the output sawtooth current waveform. Of course, resistor 37 is usually adjusted to obtain optimum linearization within the stability region.

The circuit of Figure 4 has been constructed and operated and favorable results have been obtained, by utilizing the following circuit parameters:

| | |
|---|---|
| Source 18 | 17.5 volts. |
| Resistor 21 | 7 K ohms. |
| Resistor 46 | 1.5 K ohms. |
| Condenser 45 | 10 microfarads. |
| Resistor 44 | 120 ohms. |
| Transistor 27 | 2N43. |
| Condenser 22 | 20 microfarads. |
| Resistor 32 | 500 ohms. |
| Condenser 31 | 2 microfarads. |
| Transistor 10 | 2N418. |
| Resistor 37 | 3 K ohms. |

In the circuit of Figure 4 the charging condensers are reset by means of a three-terminal switching transistor. However, this function may be achieved in accordance with the invention by means of a less expensive two-terminal unidirectional device as illustrated in the arrangement of Figure 6. The sawtooth forming drive circuitry for transistor 10 in Figure 6 is essentially the same as that shown in Figure 1. In order to achieve discharging of condenser 22 the series combination of hold control resistor 46 and a semi-conductor diode 52 is connected in shunt with condenser 22. Hold control resistor 46 in turn is bridged by the series circuit of condenser 45 and secondary winding 36 of transformer 20. For convenience, the terminal of diode 52 in which current enters (when the diode is conducting) is called the "anode terminal" and is designated by the number 54, whereas the terminal from which current leaves the diode is called the "cathode terminal" and is identified by the numeral 53. Transformer 20 is so polarized that the ungrounded terminal of secondary 36 is 180° out of phase with the terminal of primary 35 connected to collector 13. Thus, there is a phase reversal across the transformer. A peaking circuit including a resistor 55 and a condenser 56 are connected between terminal 23 and ground.

In the operation of the circuit of Figure 6, the flyback or retrace pulses of curve $E_c$ are induced into secondary 36 with positive polarity so that condenser 45 charges in response thereto, establishing anode 54 of diode 52 at a negative potential at the end of each retrace interval. Diode 52 is thus rendered non-conductive during each trace interval in order to permit condenser 22 to charge up and provide the necessary sawtooth shaped input drive current for transistor 10. The discharge circuit for condenser 45 consists of hold control resistor 46 and secondary 36 and the time constant of units 45, 36, and 46 determine the duration of each of the trace intervals. Specifically, the negative potential to which condenser 45 is charged during each retrace interval leaks off or discharges through resistor 46 during each trace interval, and thus the potential at anode 54 of diode 52 becomes progressively less negative during each trace interval as shown by waveform $E_{45}$ in Figure 6.

Meanwhile, during each trace interval the potential on cathode 53 becomes increasingly more negative as shown by waveform $E_b$. A point is reached during each trace interval when anode 54 becomes slightly positive with respect to cathode 53, at which instant diode 52 begins to conduct slightly toward terminal 23, causing condenser 22 to discharge through diode 52, condenser 45 and secondary 36. The base drive current therefore decreases, resulting in a decrease in the collector output current. The inductive component in yoke 16 differentiates this abruptly changing collector current and produces a negative going voltage excursion at collector 13. The negative excursion is transferred as a positive rise to the ungrounded terminal of secondary 36 by means of transformer 20 and this results in increasing current flow through diode 52 and correspondingly decreased base drive current through transistor 10. This regenerative cycle, which of course occurs very rapidly, continues to the point that transistor 10 becomes completely cut-off.

The abruptly changing output current in yoke 16, which gives rise to the positive retrace pulses developed at the ungrounded terminal of winding 36, effects charging of condenser 45 such that a negative potential is once again impressed on anode 54 upon the termination of each retrace interval. More specifically, condenser 45 charges up not only because of the current flowing in secondary 36 as a result of the fly-back pulses but also because of the current flowing to condenser 45 from the discharging of condenser 22.

Since the discharge time constant of condenser 45 determines the duration of each of the trace intervals, resistor 46 is made variable so that the operating frequency may be adjusted.

It is desirable to maintain the duration of each of the retrace intervals as short as possible and thus the peaking circuit of resistor 55 and condenser 56 is included in the arrangement of Figure 6. Condenser 56 charges up during each trace interval, concurrently with condenser 22, and discharges through peaking resistor 55, diode 52, condenser 45 and secondary 36 during each retrace interval in a direction to establish a positive going pulse at terminal 23; this effects faster turning off of transistor 10. The faster the transistor is rendered non-conductive, the higher the amplitude of the retrace pulses which in turn causes the diode to conduct more heavily sooner to expedite the discharge process. Because of the peaking action of resistor 55, positive going pulses 57 during the retrace times are effectively superimposed on voltage $E_b$. Since condensers 22 and 56 are essentially in parallel and charge up together, when condenser 56 is included, condenser 22 may be omitted as condenser 56 may serve to control the drive of transistor 10.

While it is preferable that retrace time be kept small relative to sweep time, it is also desirable that the voltage peak which appears on collector 13 during each retrace interval be kept as small as possible to preclude the danger of exceeding the maximum allowable collector voltage rating for the transistor. A satisfactory optimum must be established.

In the circuits of Figures 4 and 6, the discharge circuits of condenser 45 determine the duration of each sweep and thus the frequency of operation. However, the desired frequency may be determined by the saturation level of transistor 10. In Figure 6, for example, if transistor 10 is driven to the point where the collector current saturates before diode 52 conducts, a negative going excursion is still produced at collector 13 at the instant at which the transistor reaches saturation and this negative going excursion effects conduction of diode 52 in the same manner as discussed previously.

Figure 7:
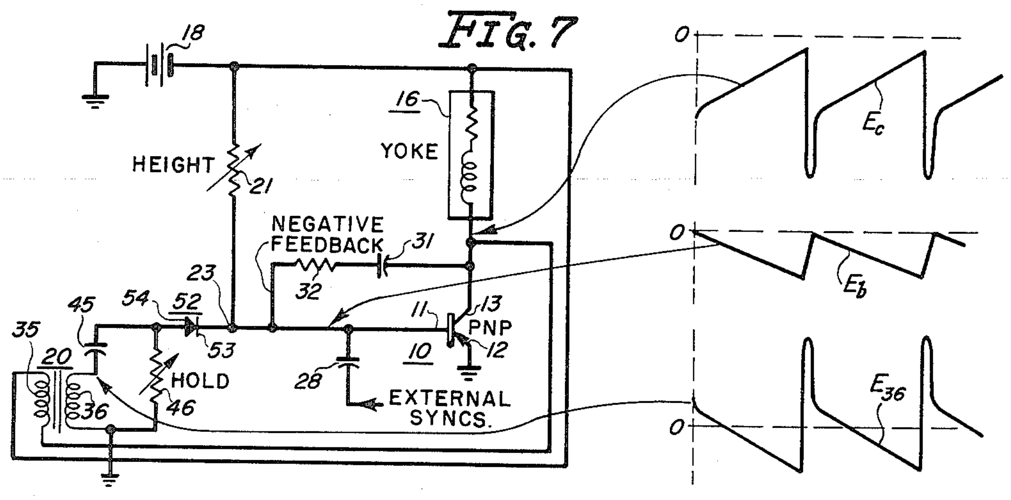

The arrangement of Figure 7 illustrates the manner in which the reset circuitry of Figure 6 may be combined with the sawtooth forming arrangement of Figure 2 in accordance with another embodiment of the invention. Anode 53 of diode 52 is coupled to base 11. The base drive current of sawtooth waveshape is translated through the base-emitter path of transistor 10 in Figure 7 to develop an amplified sawtooth current in yoke 16 in the same manner as described previously in connection with Figure 2. Condenser 45, as in the arrangement of Figure 6, charges during each retrace interval to maintain diode 52 non-conductive during each trace interval. It discharges through resistor 46 during each trace interval until the level is reached in which diode 52 conducts, which in turn causes discharging of condenser 31 and dissipation of the energy in yoke 16.

Figures 8, 9:
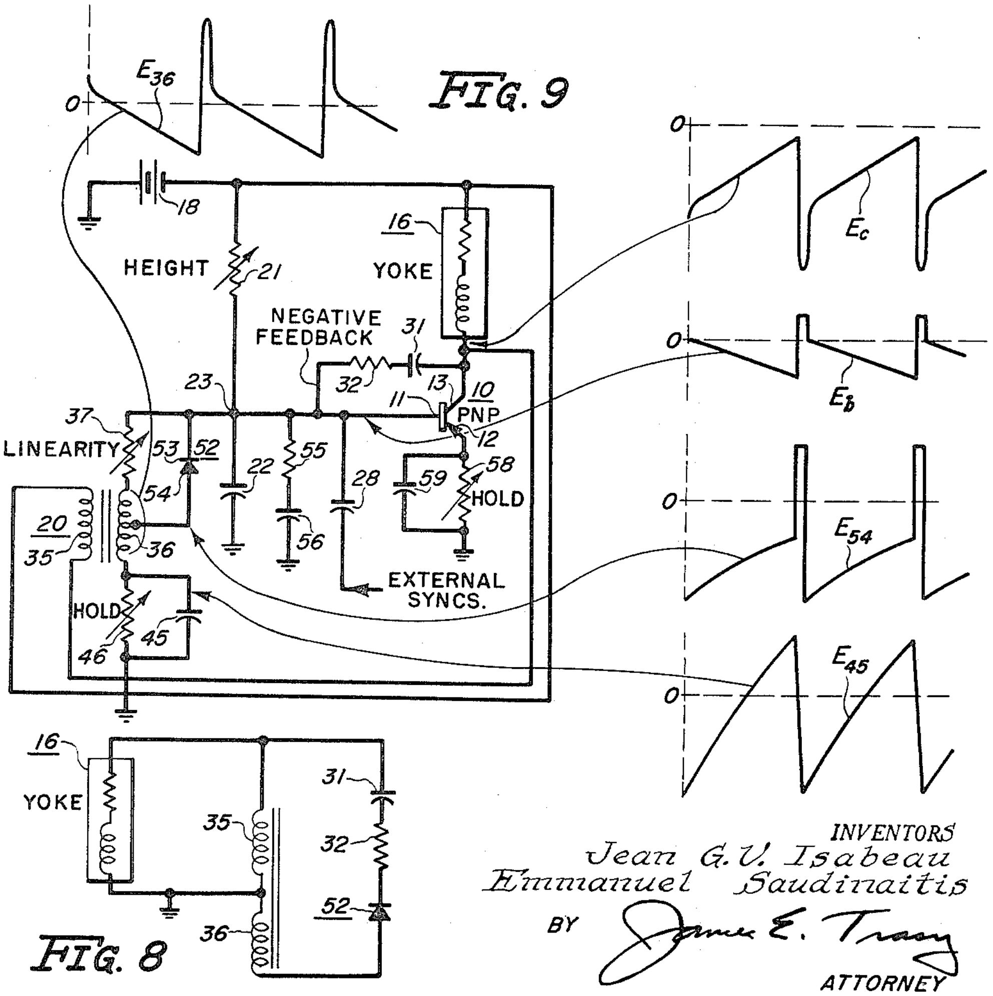
Figure 8 is an equivalent circuit diagram of the generator of Figure 7 during certain conditions of operations.
Figure 9 represents a modification of the scanning generator shown in Figure 7 and illustrates another embodiment of the invention.

In order to fully appreciate the manner in which both condenser 31 and yoke 16 may be discharged during each retrace interval, attention is directed to Figure 8 which illustrates the equivalent discharge circuit during retrace. Transistor 10 is not an active element in the circuit as it is cut-off during retrace. Additionally, the combination of condenser 45 and resistor 46 essentially represent a short circuit during each retrace period. Thus, units 45, 46 and 10 are excluded from the equivalent circuit shown in Figure 8. For an A.C. analysis of the circuitry of Figure 7 source 18 may also be ignored and thus the terminal of yoke 16 remote from condenser 31 is essentially connected to ground and hence to the grounded terminal of secondary 36. Primary 35 and secondary 36 are therefore essentially connected together as is illustrated in Figure 8. Diode 52, resistor 32 and condenser 31 are all connected in series with windings 35 and 36. It is thus apparent in Figure 8 that during retrace both yoke 16 and condenser 31 discharge through diode 52 and resistor 32, resistor 32 serving to provide retrace pulses and also to damp the yoke energy.

Figure 9 shows the sawtooth forming circuitry of Figure 4 combined with a modification of the reset arrangement shown in Figures 6 and 7, and represents another embodiment of the invention. Additionally, the peaking arrangement comprising resistors 55 and 56 is also included. In Figure 9, condenser 45 shunts resistor 46 only, one end of the resistor-condenser arrangement being grounded and the other being connected to terminal 23 in series with secondary winding 36 and linearity control resistor 37. A tap of secondary 36 is connected to anode 54 of diode 52, cathode 53 of which is connected to terminal 23. An emitter hold resistor 58, bypassed by a condenser 59, is connected between emitter 12 and ground to provide a bias for transistor 10.

The arrangement of Figure 9 operates essentially as discussed in the previous embodiments. Abruptly changing output current in yoke 16 results in condenser 45 charging to a negative potential during retrace and this negative potential leaks off through resistor 46 during each trace interval as shown by waveform $E_{45}$ in Figure 9. The output voltage waveform $E_c$ is transformed to secondary winding 36 in opposite phase as shown by $E_{36}$ and thus a voltage having the same waveform as $E_{36}$ adds to voltage waveform $E_{45}$ to provide the voltage of $E_{54}$ for anode 54 of diode 52. When anode 54 becomes positive with respect to cathode 53 a current is produced in opposite direction to the normal sawtooth base drive current in order to initiate a reset operation in the same manner as discussed hereinbefore.

It will be noted that linearity resistor 37 has been incorporated in the reset circuitry in the arrangement of Figure 9. It effects an improvement in linearity as discussed in connection with Figure 4; namely, secondary 36 provides positive feedback to supply a portion of the charging current for condensers 22 and 31. An outstanding advantage of combining the positive feedback through resistor 37 with the reset circuitry is that the voltage developed across the resistor-condenser combination 45, 46 is essentially added to the feedback voltage across secondary 36. The exponential waveshape across condenser 45 therefore is instrumental in introducing curvature in the current flowing through transistor 10 in a direction to improve linearity over that obtained by the positive feedback circuit of Figure 4 alone.

The purpose of resistor 58 and condenser 59 is to provide an adjustable bias for controlling the operating point of transistor 10. The magnitude of each retrace pulse is determined by the operating point and thus the retrace pulse amplitude may be varied to control the charge established on condenser 45 during retrace. The larger the retrace pulse is in amplitude, the greater is the potential stored on condenser 45 and the longer the time required before diode 52 becomes conductive to terminate the trace interval. Consequently, adjusting resistor 58 permits a fine control of the operating frequency. Since there may be interdependence between resistor 46 and 37, it is preferable to set resistor 46 to an optimum value and control the frequency by adjusting resistor 58.

The circuit of Figure 9, including the following components, has been constructed and operated very satisfactorily:

| | |
|---|---|
| Source **18** | 15 volts. |
| Resistor **21** | 7 K ohms. |
| Resistor **46** | 2 K ohms. |
| Condenser **45** | 5 microfarads. |
| Resistor **37** | 2 K ohms. |
| Diode **52** | 1N158. |
| Condenser **22** | Omitted. |
| Condenser **56** | 20 microfarads. |
| Resistor **55** | 100 ohms. |
| Resistor **32** | 560 ohms. |
| Condenser **31** | 2 microfarads. |
| Transistor **10** | 2N418. |
| Resistor **58** | 1 ohm. |
| Condenser **59** | 3000 microfarads. |

In summary, the invention provides a cyclically operating scanning generator for developing in magnetic deflection yoke 16 a periodically recurring substantially linear sawtooth current waveform having during each cycle a relatively long trace interval and a relatively short retrace interval. In the embodiment of Figure 9, for example, source 18 effectively establishes a forward bias between base 11 and emitter 12 of three-terminal transistor 10. Condenser 22 charges through its charging circuit including height control resistor 21 and develops during each of the trace intervals a gradually varying voltage exhibiting a waveshape of substantially constant slope, as shown by waveform $E_b$ in Figure 9. Condenser 22 is coupled to base electrode 11 for translating a gradually varying input drive current, also of substantially constant slope, through the base-emitter conduction path of transistor 10 during each of the trace intervals. Unidirectional device 52, secondary winding 36, resistor 46 and condenser 45 collectively constitute a discharge circuit for rapidly discharging condenser 22 during each retrace interval. The load circuit including magnetic deflection yoke 16 is coupled between emitter 12 and collector 13 and establishes an amplified output current in the magnetic deflection yoke of substantially the same waveshape as that of the input drive current with gradually varying output current during each of the trace intervals and abruptly changing output current during each of the retrace intervals. Finally, condenser 45 and transformer 20 constitute means for maintaining unidirectional device or diode 52 in its cut-off condition during each of the trace intervals and in its conductive condition during each of the retrace intervals.

Of course, while PNP type transistors have been embodied in the invention as illustrated, it is obvious that by simple modification transistors of opposite gender, namely NPN, can be utilized.

The invention provides, therefore, a transistor scanning generator which may be employed in a conventional television receiver. It incorporates transistors in place of more conventional vacuum tubes and provides sweep linearity and stability fully commensurate with accepted standards. Power requirements are substantially below those of more conventional vacuum tube circuitry and the number of components required is relatively small. The generator is free running with provisions for external synchronization.

While particular embodiments of the invention have been shown and described, modifications may be made, and it is intended in the appended claims to cover all such modifications as may fall within the true spirit and scope of the invention.

We claim:

1. A cyclically operating scanning generator for developing in a magnetic deflection yoke a periodically recurring substantially linear sawtooth current waveform having during each cycle a relatively long trace interval and a relatively short retrace interval, comprising: a three-terminal transistor having base, emitter and collector electrodes; means including a source of unidirectional operating potential for establishing a forward bias between said base and emitter electrodes; a condenser; a charging circuit for developing across said condenser during each of said trace intervals a gradually varying voltage exhibiting a waveshape of substantially constant slope; means coupling said condenser to said base electrode for translating a gradually varying input drive current, also of substantially constant slope, through the base-emitter conduction path of said transistor during each of said trace intervals; a discharge circuit for rapidly discharging said condenser during each of said retrace intervals and including a unidirectional device having at least two terminals; a load circuit including said magnetic deflection yoke coupled between said emitter and collector electrodes and establishing an amplified output current in said magnetic deflection yoke of substantially the same waveshape as that of said input drive current with gradually varying output current during each of said trace intervals and abruptly changing output current during each of said retrace intervals; and means for establishing conduction in said unidirectional device during each of said retrace intervals and for maintaining said device in its cut-off condition during each of said trace intervals.

2. A cyclically operating scanning generator for developing in a magnetic deflection yoke a periodically recurring substantially linear sawtooth current waveform having during each cycle a relatively long trace interval and a relatively short retrace interval, comprising: a three-terminal transistor having base, emitter and collector electrodes; means including a source of unidirectional operating potential for establishing a forward bias between said base and emitter electrodes; a first condenser; a charging circuit for developing across said first condenser during each of said trace intervals a gradually varying voltage exhibiting a waveshape of substantially constant slope; means coupling said first condenser to said base electrode for tranlating a gradually varying input drive current, also of substantially constant slope, through the base-emitter conduction path of said transistor during each of said trace intervals; a discharge circuit for rapidly discharging said first condenser during each of said retrace intervals including a semi-conductive unidirectional device having at least two terminals; a load circuit including said magnetic deflection yoke coupled between said emitter and collector electrodes and establishing an amplified output current in said magnetic deflection yoke of substantially the same waveshape as that of said input drive current with gradually varying output current during each of said trace intervals and abruptly changing output current during each of said retrace intervals; means for maintaining said unidirectional device in its cut-off condition during each of said trace intervals including a second condenser having a discharge time constant determining the duration of each of said trace intervals, said discharge circuit becoming operative when the charge on said second condenser reaches a predetermined level; and means coupling said load circuit to said second condenser for utilizing said abruptly changing output current in said magnetic deflection yoke during each of said retrace intervals to charge said second condenser in order to render said unidirectional device once again non-conductive.

3. A cyclically operating scanning generator for developing in a magnetic deflection yoke a periodically recurring substantially linear sawtooth current waveform having during each cycle a relatively long trace interval and a relatively short retrace interval, comprising: a three-terminal transistor having base, emitter and collector electrodes; means including a source of unidirectional operating potential for establishing a forward bias between said base and emitter electrodes; a first condenser; a charging circuit for developing across said first condenser during each of said trace intervals a gradually varying voltage exhibiting a waveshape of substantially constant slope; means coupling said first condenser to said base electrode for translating a gradually varying input drive current, also of substantially constant slope, through the base-emitter conduction path of said transistor during each of said trace intervals; a discharge circuit for rapidly discharging said first condenser during each of said retrace intervals including a semi-conductive unidirectional device having at least two terminals; a load circuit including said magnetic deflection yoke coupled between said emitter and collector electrodes and establishing an amplified output current in said magnetic deflection yoke of substantially the same waveshape as that of said input drive current with gradually varying output current during each of said trace intervals and abruptly changing output current during each of said retrace intervals; means including a second condenser for maintaining said unidirectional device in its cut-off condition during each of said trace intervals; and means couplng said load circuit to said unidirectional device and to said second condenser for utilizing said abruptly changing output current in said magnetic deflection yoke during each of said retrace intervals to initially render said unidirectional device conductive and to subsequently charge said second condenser in order to render said unidirectional device once again non-conductive.

4. A cyclically operating, free running scanning generator for developing in a magnetic deflection yoke, having an inductive component, a periodically recurring substantially linear sawtooth waveform having during each cycle a relatively long trace interval and a relatively short retrace interval, comprising: a three-terminal transistor having base, emitter and collector electrodes; means including a source of unidirectional operating potential for establishing a forward bias between said base and emitter electrodes; a first condenser; a charging circuit for developing across said first condenser during each of said trace intervals a gradually increasing voltage exhibiting a waveshape of substantially constant slope; means coupling said first condenser to said base electrode for translating a gradually increasing input drive current, also of substantially constant slope, through the base-emitter conduction path of said transistor during each of said trace intervals; a discharge circuit for rapidly discharging said first condenser during each of said retrace intervals and including a two-terminal semi-conductive, unidirectional device; a load circuit including said magnetic deflection yoke coupled between said emitter and collector electrodes and establishing an amplified output current in said magnetic deflection yoke of substantially the same waveshape as that of said input drive current with gradually increasing output current during each of said trace intervals until said output current reaches the saturation level of said transistor, at which time said output current ceases to increase thereby developing a voltage pulse in said load circuit during the immediately succeeding retrace interval; means including a second condenser for maintaining said unidirectional device in its cut-off condition during each of said trace intervals; and means coupling said load circuit to said second condenser for utilizing each of said voltage pulses to initially render said unidirectional device conductive to discharge said first condenser and to subsequently charge said second condenser in order to render said unidirectional device once again non-conductive.

5. A cyclically operating scanning generator for developing in a magnetic deflection yoke a periodically recurring substantially linear sawtooth current waveform having during each cycle a relatively long trace interval and a relatively short retrace interval, comprising: a three-terminal transistor having base, emitter and collector electrodes; means including a source of unidirectional operating potential for establishing a forward bias between said base and emitter electrodes; a negative feedback integrating circuit including a first condenser coupled between said base and collector electrodes; a charging circuit for developing across said first condenser during each of said trace intervals a gradually varying voltage exhibiting a waveshape of substantially constant slope, said first condenser thereby translating a gradually varying input drive current, also of substantially constant slope, through the base-emitter conduction path of said transistor during each of said trace intervals; a discharge circuit for rapidly discharging said first condenser during each of said retrace intervals and including a two-terminal semi-conductive, unidirectional device; a load circuit including said magnetic deflection yoke coupled between said emitter and collector electrodes and establishing an amplified output current in said magnetic deflection yoke of substantially the same waveshape as that of said input drive current with gradually varying output current during each of said trace intervals and abruptly changing output current during each of said retrace intervals; means including a second condenser for maintaining said unidirectional device in its cut-off condition during each of said trace intervals; and means coupling said load circuit to said unidirectional device for utilizing said abruptly changing output current in said magnetic deflection yoke during each of said retrace intervals to establish conduction in said device and to charge said second condenser in order to render said unidirectional device once again non-conductive.

6. A cyclically operating scanning generator for developing in a magnetic deflection yoke a periodically recurring substantially linear sawtooth current waveform having during each cycle a relatively long trace interval and a relatively short retrace interval, comprising: a three-terminal transistor having base, emitter and collector electrodes; means including a source of unidirectional operating potential for establishing a forward bias between said base and emitter electrodes; a first condenser coupled between said base and emitter electrodes; a charging circuit for developing across said first condenser during each of said trace intervals a gradually varying voltage exhibiting a waveshape of substantially constant slope, said first condenser thereby translating a gradually varying input drive current, also of substantially constant slope, through the base-emitter conduction path of said transistor during each of said trace intervals; a discharge circuit for rapidly discharging said first condenser during each of said retrace intervals and including a two-terminal semi-conductive, unidirectional device; a load circuit including said magnetic deflection yoke coupled between said emitter and collector electrodes and establishing an amplified output current in said magnetic deflection yoke of substantially the same waveshape as that of said input drive current with gradually varying output current during each of said trace intervals and abruptly changing output current during each of said retrace intervals; means for maintaining said unidirectional device in its cut-off condition during each of said trace intervals including a second condenser having a discharge time constant determining the duration of each of said trace intervals, said discharge circuit becoming operative when the charge on said second condenser reaches a predetermined level; and means coupling said load circuit to said second condenser for utilizing said abruptly changing output current in said magnetic deflection yoke during each of said retrace intervals to charge said second condenser in order to render said unidirectional device once again non-conductive.

7. A cyclically operating scanning generator for developing in a magnetic deflection yoke a periodically recurring substantially linear sawtooth current waveform having during each cycle a relatively long trace interval and a relatively short retrace interval, comprising: a three-terminal transistor having base, emitter and collector electrodes; means including a source of unidirectional operating potential for establishing a forward bias between said base and emitter electrodes; a first condenser; a charging circuit for developing across said first condenser during each of said trace intervals a gradually varying voltage exhibiting a waveshape of substantially constant slope; means coupling said first condenser to said base electrode for translating a gradually varying input drive current, also of substantially constant slope, through the base-emitter conduction path of said transistor during each of said trace intervals; a discharge circuit for rapidly discharging said first condenser during each of said retrace intervals and including a semi-conductive unidirectional device having at least two terminals; a load circuit including said magnetic deflection yoke coupled between said emitter and collector electrodes and establishing an amplified output current in said magnetic deflection yoke of substantially the same waveshape as that of said input drive current with gradually varying output current during each of said trace intervals and abruptly changing output current during each of said retrace intervals; means for maintaining said unidirectional device in its cut-off condition during each of said trace intervals and including a second condenser having a discharge time constant determining the duration of each of said trace intervals, said discharge circuit becoming operative when the charge on said second condenser reaches a predetermined level; means coupling said load circuit to said second condenser for utilizing said abruptly changing output current in said magnetic deflection yoke during each of said retrace intervals to charge said second condenser in order to render said unidirectional device once again non-conductive; and means for applying external synchronizing pulses to said base electrode.

8. A cyclically operating scanning generator for developing in a magnetic deflection yoke a periodically recurring substantially linear sawtooth current waveform having during each cycle a relatively long trace interval and a relatively short retrace interval, comprising: a three-terminal transistor having base, emitter and collector electrodes; means including a source of unidirectional operating potential for establishing a forward bias between said base and emitter electrodes; a first condenser; a charging circuit for developing across said first condenser during each of said trace intervals a gradually increasing voltage exhibiting a waveshape of substantially constant slope; means coupling said first condenser to said base electrode for translating a gradually increasing input drive current, also of substantially constant slope, through the base-emitter conduction path of said transistor during each of said trace intervals; a load circuit including said magnetic deflection yoke coupled between said emitter and collector electrodes and establishing an amplified output current in said magnetic deflection yoke of substantially the same waveshape as that of the input current; a discharge circuit for rapidly discharging said first condenser during each of said retrace intervals and including a semi-conductive unidirectional device having at least two terminals; a second condenser, and a discharge circuit therefor, coupled to said unidirectional device for controlling the conductivity condition thereof; and means coupling said load circuit to said second condenser for charging said second condenser during each of said retrace intervals to maintain said unidirectional device in its cut-off condition during each of said trace intervals, said second condenser discharging through its discharge circuit during each of said trace intervals to a predetermined level at which time said unidirectional device becomes conductive to discharge said first condenser.

9. A cyclically operating scanning generator for developing at a predetermined frequency in a magnetic deflection yoke a periodically recurring substantially linear sawtooth current waveform having during each cycle a relatively long trace interval and a relatively short retrace interval, comprising: a three-terminal transistor having base, emitter and collector electrodes; means including a source of unidirectional operating potential for establishing a forward bias between said base and emitter electrodes; a first condenser; a charging circuit for developing across said first condenser during each of said trace intervals a gradually varying voltage exhibiting a waveshape of substantially constant slope; means coupling said first condenser to said base electrode for translating a gradually varying input drive current, also of substantially constant slope, through the base-emitter conduction path of said transistor during each of said trace intervals; a discharge circuit for rapidly discharging said first condenser during each of said retrace intervals and including a two-terminal semi-conductive, unidirectional device; a load circuit, substantially resistive at said predetermined frequency and including said magnetic deflection yoke, coupled between said emitter and collector electrodes and establishing an amplified output current in said magnetic deflection yoke of substantially the same waveshape as that of said input drive current with gradually varying output current during each of said trace intervals and abruptly changing output current during each of said retrace intervals, said magnetic deflection yoke storing energy during each of said trace intervals; means for maintaining said unidirectional device in its cut-off condition during each of said trace intervals and including a second condenser having a discharge time constant determining the duration of each of said trace intervals, said discharge circuit becoming operative when the charge on said second condenser reaches a predetermined level; means coupling said load circuit to said second condenser for utilizing said abruptly changing output current in said magnetic deflection yoke during each of said retrace intervals to charge said second condenser in order to render said unidirectional device once again non-conductive; and damping means coupled to said magnetic deflection yoke for dissipating during each of said retrace intervals the energy stored during the immediately preceding trace interval.

10. A cyclically operating scanning generator for developing in a magnetic deflection yoke a periodically recurring substantially linear sawtooth current waveform having during each cycle a relatively long trace interval and a relatively short retrace interval, comprising: a three-terminal transistor having base, emitter and collector electrodes and subject to undesirable variations in current gain and/or base-emitter input resistance with changing base current; means including a source of unidirectional operating potential for establishing a forward bias between said base and emitter electrodes; a first condenser; a charging circuit for developing across said first condenser during each of said trace intervals a gradually varying voltage exhibiting a waveshape of substantially constant slope; means coupling said first condenser to said base electrode for translating a gradually varying input drive current, also of substantially constant slope, through the base-emitter conduction path of said transistor during each of said trace intervals; a discharge circuit for rapidly discharging said first condenser during each of said retrace intervals and including a semi-conductive unidirectional device having at least two terminals; a load circuit including said magnetic deflection yoke coupled between said emitter and collector electrodes and establishing an amplified output current in said magnetic deflection yoke of substantially the same waveshape as that of said input drive current with gradually varying output current during each of said trace intervals and abruptly changing output current during each of said retrace intervals; means for maintaining said unidirectional device in its cut-off condition during each of said trace intervals and including a second condenser having a discharge time constant determining the duration of each of said trace intervals, said discharge circuit becoming operative when the charge on said second condenser reaches a predetermined level; means coupling said load circuit to said second condenser for utilizing said abruptly changing output current in said magnetic deflection yoke during each of said retrace intervals to charge said second condenser in order to render said unidirectional device once again non-conductive; and a negative feedback integrating circuit coupled between said base and collector electrodes for increasing the linearity of the time rate of change in output current of said magnetic deflection yoke to compensate for any undesirable changes in current gain and/or input resistance of said transistor.

11. A cyclically operating scanning generator for developing in a magnetic deflection yoke a periodically recurring substantially linear sawtooth current waveform having during each cycle a relatively long trace interval and a relatively short retrace interval, comprising: a three-terminal transistor having base, emitter and collector electrodes; means including a source of unidirectional operating potential for establishing a forward bias between said base and emitter electrodes; a first condenser; a source of substantially constant current; a charging circuit coupling said source of constant current to said first condenser for translating substantially constant charging current of a predetermined magnitude to said first condenser to develop thereacross during each of said trace intervals a gradually increasing voltage; means coupling said first condenser to said base electrode for translating a gradually increasing input drive current from said constant current source through the base-emitter conduction path of said transistor during each of said trace intervals, said increasing input drive current effectively subtracting from said predetermined magnitude tending to decrease the current available for charging said first condenser to introduce undesirable non-linearity in the time rate of change of voltage developed across said first condenser and thereby the input drive current translated through said base-emitter conduction path; a discharge circuit for rapidly discharging said first condenser during each of said retrace intervals and including a two-terminal semi-conductive, unidirectional device; a load circuit including said magnetic deflection yoke coupled between said emitter and collector electrodes and establishing an amplified output current in said magnetic deflection yoke of substantially the same waveshape as that of said input drive current with gradually varying output current during each of said trace intervals and abruptly changing output current during each of said retrace intervals; means for maintaining said unidirectional device in its cut-off condition during each of said trace intervals and including a second condenser having a discharge time constant determining the duration of each of said trace intervals, said discharge circuit becoming operative when the charge on said second condenser reaches a predetermined level; means coupling said load circuit to said second condenser for utilizing said abruptly changing output current in said magnetic deflection yoke during each of said retrace intervals to charge said second condenser in order to render said unidirectional device once again non-conductive; and a positive feedback circuit coupled between said base and collector electrodes for supplying current to said first condenser during each of said trace intervals to compensate the tendency of said base-emitter path to draw on said charging current thereby to linearize the time rate of change of voltage developed across said first condenser and the input drive current translated through said base-emitter conduction path.

12. A cyclically operating scanning generator for developing in a magnetic deflection yoke a periodically recurring substantially linear sawtooth current waveform having during each cycle a relatively long trace interval and a relatively short retrace interval, comprising: a three-terminal transistor having base, emitter and collector electrodes; means including a source of unidirectional operating potential for establishing a forward bias between said base and emitter electrodes; a first condenser; a source of substantially constant current; a charging circuit coupling said source of constant current to said first condenser for translating substantially constant charging current of a predetermined magnitude to said first condenser to develop thereacross during each of said trace intervals a gradually increasing voltage; means coupling said first condenser to said base electrode for translating a gradually increasing input drive current from said constant current source through the base-emitter conduction path of said transistor during each of said trace intervals, said increasing input drive current effectively subtracting from said predetermined magnitude tending to decrease the current available for charging said first condenser to introduce undesirable non-linearity in the time rate of change of voltage developed across said first condenser and thereby the input drive current translated through said base-emitter conduction path; a load circuit including said magnetic deflection yoke coupled between said emitter and collector electrodes and establishing an amplified output current in said magnetic deflection yoke of substantially the same waveshape as that of the input current; a discharge circuit for rapidly discharging said condenser during each of said first retrace intervals and including a two-terminal semi-conductive, unidirectional device; a second condenser, and a discharge circuit therefor, coupled to said unidirectional device for controlling the conductivity condition thereof; means coupling said load circuit to said second condenser for charging said second condenser during each of said retrace intervals to maintain said unidirectional device in its cut-off condition during each of said trace intervals, said second condenser discharging through its discharge circuit during each of said trace intervals to a predetermined level at which time said unidirectional device becomes conductive to discharge said first condenser; and a positive feedback circuit coupled between said base and collector electrodes and also to said second condenser for supplying current to said first condenser during each of said trace intervals determined in part by the rate of discharge of said second condenser to compensate the tendency of said base-emitter path to draw on said charging current thereby to linearize the time rate of change of voltage developed across said first condenser and the input drive current translated through said base-emitter conduction path.

13. A cyclically operating scanning generator for developing in a magnetic deflection yoke a periodically recurring substantially linear sawtooth current waveform having during each cycle a relatively long trace interval and a relatively short retrace interval, comprising: a three-terminal transistor having base, emitter and collector electrodes; means including a source of unidirectional operating potential for establishing a forward bias between said base and emitter electrodes; a first condenser; a charging circuit for developing across said first condenser during each of said trace intervals a gradually varying voltage exhibiting a waveshape of substantially constant slope; means coupling said first condenser to said base electrode for translating a gradually varying input drive current, also of substantially constant slope, through the base-emitter conduction path of said transistor during each of said trace intervals; a discharge circuit for rapidly discharging said first condenser during each of said retrace intervals and including a semi-conductive unidirectional device having at least two terminals; a load circuit including said magnetic deflection yoke coupled between said emitter and collector electrodes and establishing an amplified output current in said magnetic deflection yoke of substantially the same waveshape as that of said input drive current with gradually varying output current during each of said trace intervals and abruptly changing output current during each of said retrace intervals; means for maintaining said unidirectional device in its cut-off condition during each of said trace intervals and including a second condenser having a discharge time constant determining the duration of each of said trace intervals, said discharge circuit becoming operative when the charge on said second condenser reaches a predetermined level; means coupling said load circuit to said second condenser for utilizing said abruptly changing output current in said magnetic deflection yoke during each of said retrace intervals to charge said second condenser in order to render said unidirectional device once again non-conductive; and means for developing a retrace pulse during each of said retrace intervals and for utilizing said pulses to instantaneously render said transistor non-conductive to minimize the duration of each of said retrace intervals.

14. A cyclically operating scanning generator for developing in a magnetic deflection yoke a periodically recurring substantially linear sawtooth current waveform having during each cycle a relatively long trace interval and a relatively short retrace interval, comprising: a three-terminal transistor having base, emitter and collector electrodes; means including a source of unidirectional operating potential for establishing a forward bias between said base and emitter electrodes; a first condenser; a charging circuit for developing across said first condenser during each of said trace intervals a gradually varying voltage exhibiting a waveshape of substantially constant slope; means coupling said first condenser to said base electrode for translating a gradually varying input drive current, also of substantially constant slope, through the base-emitter conduction path of said transistor during each of said trace intervals; a discharge circuit for rapidly discharging said first condenser during each of said retrace intervals and including a semi-conductive unidirectional device having at least two terminals; a load circuit including said magnetic deflection yoke coupled between said emitter and collector electrodes and establishing an amplified output current in said magnetic deflection yoke of substantially the same waveshape as that of said input drive current with gradually varying output current during each of said trace intervals and abruptly changing output current during each of said retrace intervals; means for maintaining said unidirectional device in its cut-off condition during each of said trace intervals and including a second condenser having a discharge time constant determining the duration of each of said trace intervals, said discharge circuit becoming operative when the charge on said second condenser reaches a predetermined level; means coupling said load circuit to said second condenser for utilizing said abruptly changing output current in said magnetic deflection yoke during each of said retrace intervals to charge said second condenser in order to render said unidirectional device once again non-conductive; a peaking resistor coupled to said base electrode; and means for developing a voltage pulse across said resistor during each of said retrace intervals to instantaneously render said transistor non-conductive to minimize the duration of each of said retrace intervals.

15. A cyclically operating scanning generator for developing in a magnetic deflection yoke a periodically recurring substantially linear sawtooth current waveform having during each cycle a relatively long trace interval and a relatively short retrace interval, comprising: a three-terminal transistor having base, emitter and collector electrodes; means including a source of unidirectional operating potential for establishing a forward bias between said base and emitter electrodes; a first condenser; a charging circuit for developing across said first condenser during each of said trace intervals a gradually increasing voltage exhibiting a waveshape of substantially constant slope; means coupling said first condenser to said base electrode for translating a gradually increasing input drive current, also of substantially constant slope, through the base-emitter conduction path of said transistor during each of said trace intervals; a load circuit including said magnetic deflection yoke coupled between said emitter and collector electrodes and establishing an amplified output current in said magnetic deflection yoke of substantially the same waveshape as that of the input current; a discharge circuit for rapidly discharging said first condenser during each of said retrace intervals and including a semi-conductive unidirectional device having at least two terminals; a second condenser, and a discharge circuit therefor, coupled to said unidirectional device for controlling the conductivity condition thereof; means coupling said load circuit to said second condenser for charging said second condenser during each of said retrace intervals to maintain said unidirectional device in its cut-off condition during each of said trace intervals, said second condenser discharging through its discharge circuit during each of said trace intervals to a predetermined level at which time said unidirectional device becomes conductive to discharge said first condenser; and a resistor-condenser parallel combination coupled in series with the base-emitter conduction path of said transistor for biasing said transistor to partially determine the predetermined level at which said unidirectional device becomes conductive.

References Cited in the file of this patent

UNITED STATES PATENTS

| | | |
|---|---|---|
| 2,847,569 | Finkelstein | Aug. 12, 1958 |
| 2,891,192 | Goodrich | June 16, 1959 |

FOREIGN PATENTS

| | | |
|---|---|---|
| 1,140,766 | France | Mar. 4, 1957 |